United States Patent [19]

Chang

[11] Patent Number: 5,032,652

[45] Date of Patent: Jul. 16, 1991

[54] SUPPORTED VANADIUM CATALYST FOR POLYMERIZATION OF OLEFINS AND A PROCESS OF PREPARING AND USING THE SAME

[75] Inventor: Main Chang, Houston, Tex.

[73] Assignee: Exxon Chemical Patents Inc., Linden, N.J.

[21] Appl. No.: 430,991

[22] Filed: Nov. 2, 1989

Related U.S. Application Data

[62] Division of Ser. No. 268,833, Nov. 8, 1989, Pat. No. 4,904,631.

[51] Int. Cl.$^5$ .............................................. C08F 4/68
[52] U.S. Cl. .............................. 526/129; 526/348.2; 526/352; 502/120
[58] Field of Search ........................................ 526/129

[56] References Cited

U.S. PATENT DOCUMENTS 4,752,597  6/1988  Turner .................................... 526/84
4,769,428  9/1988  Zboril et al. ...................... 526/92 X

FOREIGN PATENT DOCUMENTS 170059  5/1986  European Pat. Off. ............ 502/120

*Primary Examiner*—Patrick P. Garvin
*Attorney, Agent, or Firm*—M. B. Kurtzman

[57] ABSTRACT

This invention relates to a supported vanadium-alumoxane catalyst for use in gas and liquid polymerization of olefins. The invention particularly relates to the use of silica gel containing from about 6 to about 20 percent by weight adsorbed water as the catalyst support material. The particle size of the silica gel is generally between about 0.1 and 200.0μ. Such silica gel may be safely added to a trialkylaluminum solution to form by direct reaction with the adsorbed water content of the silica gel catalyst support material the alumoxane cocatalyst component of the catalyst system. An alumoxane coated silica gel is formed to which a vanadium compound is added and the resulting material dried to a free flowing powder. The dry free flowing powder may then be used as a supported vanadium alumoxane catalyst complex for the polymerization of olefins. Resins produced from such processes have a broad molecular weight distribution suitable in blow molding for the fabrication of household and industrial containers.

11 Claims, No Drawings

SUPPORTED VANADIUM CATALYST FOR POLYMERIZATION OF OLEFINS AND A PROCESS OF PREPARING AND USING THE SAME

This is a division of application Ser. No. 268,833, filed 11/08/89 and now U.S. Pat. No. 4,904,631.

This invention relates to a supported vanadium alumoxane catalyst complex. The catalyst support is a silica gel containing from about 6 to about 20 per cent by weight adsorbed water. Such silica gel is added to a trialkylaluminum solution to form, by direct reaction of the trialkylaluminum with the adsorbed water content of the siica gel, an alumoxane coated silica gel. A vanadium containing compound is added to the alumoxane coated silica gel and the resulting material dried to a free flowing powder. The dry free flowing powder comprising a supported vanadium alumoxane catalyst complex can be used in gas and liquid phase olefinic polymerization processes to produce resins with a broad molecular weight distribution. Further, when used in such processes the catalyst complexes of this invention do not require the use of a halogenated alkane promoter as with other vanadium-containing olefin polymerization catalysts in order to exhibit a sufficiently high level of productivity as to be commercially useful.

BACKGROUND TO THE INVENTION

Catalysts for the polymerization of olefins comprising either (a) a metallocene-aumoxane complex or (b) a complex formed from transition meta (IVB, VB) and organoaluminum compounds are known in the art. Australian Patent No. 220436 discloses a catalyst comprising the reaction product of a metallocene [bis(cyclopentadienyl)] vanadium salt with a variety of aluminum alkyl compounds. As illustrated by the art, when cocatalyzed with an aluminum alkyl, although a metallocene will exhibit some catalytic activity, the degree of activity is too low to be commercially useful.

The production of a metalocene-based catalyst of commercially useful activity requires the use of an aumoxane as the cocatalyst. Heretofore, the requirement for an alumoxane cocatalyst has entailed extra cost and/or production procedures for preparing a metallocene-based catalyst. An alumoxane is formed prom he highly rapid and exothermic reaction of an aluminum alkyl with water. Because of the extreme violence of the reaction the alumoxane component has previously been separately prepared by one of two general methods. In one method, referred to as the "wet solvent production method", extremely finely divided water, such as in the form of a humid solvent, is added to a solution of aluminum alkyl in benzene or other aromatic hydrocarbon. The production of an aumoxane by this process requires use of explosion-proof equipment and very close control of the reaction conditions in order to reduce potential fire and explosion hazards. For this reason, it has been preferred to produce alumoxane by the second method, of the referred to as the "hydrated salt method". In this process, an aluminum alkyl is reacted with a hydrated salt, such as hydrated copper sulfate. A slurry of finely divided copper sulfate pentahydrate and toluene is formed and mantled under an inert gas. Aluminum akyl is then slowly added to the slurry with stirring and the reaction mixture is maintained at room temperature for 24 to 40 hours during which a slow hydrolysis occurs by which alumoxane is produced. Although the production of alumoxane by the hydrated salt method significantly reduces the explosion and fire hazard inherent in the wet solvent production method, production of the alumoxane must nevertheless be carried out separately. Further, before the alumoxane can be used for the production of an active catalyst complex and hydrated salt reagent must be separated from the alumoxane to prevent it from becoming entrained in the catalyst complex and thus contaminating any polymer produced therewith. The process is slow and produces hazardous wastes that create waste disposal problems.

In certain instances wherein a filled polyolefin resin is to be produced the requisite alumoxane cocatalyst may be produced by reaching a trialkylaluminum with the filler material when forming the metallocene-alumoxane catalyst complex on the surface of the filler material. For example, U.S. Pat. No. 4,431,788 discloses a catalyst comprising a metallocene complex and starch. These catalysts are produced by a reacting a triakyaluminum with starch particles having a moisture content below 7 weight percent. The starch particles are then treated with a metallocene to form metallocene-alumoxane catalyst complex on the surface of the starch particles. An olefin is then polymerized about the starch particles by solution or suspension polymerization procedures to form a free-flowing composition of polyoefin-coated starch particles.

Unlike the case of metallocene-based catalysts, the art teaches that the cocatalyst for a catalyst containing a vanadium component (such as $VCl_4$ or $VOCl_3$) should be an aluminum alkyl. In particular, U.S. Pat. Nos. 4,579,835; 4,607,019 and 4,607,751, disclose the production of a silica gel supported vanadium-based catalyst, and specify that the silica gel must first be dehydrated to remove any water and to reduce the concentration of surface hydroxyl groups which otherwise could react with the aluminum alkyl.

To obtain a degree of productivity useful for commercial production of polyolefins, such prior art supported vanadium catalyst further require the presence of a "promoter" in the polymerization reactor. Halogenated alkanes, such as chloroform or Freon 11, are typically used as a promoter to elevate the productivity of the prior art vanadium based catalyst composition to a level sufficient for commercial production. It is believed that the promoter oxidized the valadium cation to the higher (III) oxidation state which renders the catalyst its most active, whereas the aluminum alkyl co-catalyst reduces the vanadium cation to the less active (II) oxidation state during polymerization. Therefore, continuous supply of promoter during polymerization has been required to maintain the requisite concentration of vanadium (III) in order to maintain productivity of the catalyst at a useful level.

Consequently, polymerization processes catalyzed by the prior art vanadium-aluminum alkyl complexes suffer several serious disadvantages. Since the prior art vanadium catalysts are effective only in the presence of a promoter, the process of preparing the polyolefins requires extra procedural steps. In particular, the introduction of promoter and vanadium-aluminum catalyst requires distinct steps. Further, the operator must constantly monitor the level of promoter in the reactor in order to obtain efficiency of the prior art vanadium catalyst complex.

The most effective promoters for the prior art vanadium catalyst complexes are, generally, halogenated alkanes. Suitable promoters, such as chloroform and dichlorodifluoroethane, have an undesired halogen residue in the polymeric end-products. Consequently, use of halogen promoters with the prior art vanadium catalyst complexes may render the polyolefin product highly corrosive or require post polymerization treatment of the polymer product for removal of halogen residue.

Resins produced from the supported vanadium catalysts are typically characterized by a broader molecular weight distribution (MWD), compared to resins made by other transistion metal catalysts. Such resins are suitable for application in blow molding.

It would be advantageous to develop a vanadium based supported catalyst useful for the polymerization of olefins which does not require the assistance of a promoter and which exhibits high activity and efficiency. Further, it would be most desirable to produce a catalyst capable of rendering anon-corrosive resin having a broad molecular weight distribution.

It would further be most desirable to devise an economical procedure whereby such catalysts could be safely and economically produced.

SUMMARY OF THE INVENTION

This invention discloses a novel vanadium based supported catalyst useful in the production of polyolefins of broad molecular weight distribution ("MWD"). Such resins have particular applicability in blow molding operations. Further, the catalyst of this invention exhibits high productivity in the absence of a halogenated promoter.

The catalyst system of this invention comprises a vanadium compound which is cocatalyzed with an alumoxane which is formed by the reaction of a trialkylaluminum with an undehydrated silica gel. The catalyst system of this invention utilizes as the support material silica gel. Desirably, the silica particles will have a surface area in the range of about 10 m$^2$/g to about 700 m$^2$/g, preferably about 100–500 m$^2$/g and desirably about 200–400 m$^2$/g, a pore volume of about 3 to about 0.5 cc/g and preferably 2–1 cc/g and an adsorbed water content of from about 6 to about 20 weight percent, preferably from about 7 to about 15 weight percent. The particle size of the silica is generally from about 0.1 to about 200μ. The silica particles reference above are hereinafter referred to as undehydrated silica gel.

The silica gel supported vanadium alumoxane catalyst is prepared by adding the undehydrated silica gel to a stirred solution of trialkylaluminum in an amount sufficient to provide a mole ratio of trialkylaluminum to water of from about 3:1 to about 1:2, preferably 1.2:1 to about 0.8:1; thereafter adding to this stirred solution a vanadium containing compound in an amount sufficient to provide an aluminum to vanadium ratio of from about 1000:1 to 1:1, preferably from about 300:1 to 10:1, most preferably from about 150:1 to about 30 1; removing the solvent and drying the solids to a free flowing powder. Drying can be obtained by modest heating or vacuum.

The dried free flowing powder comprises a vanadium alumoxane catalyst complex adsorbed upon the surface of the silica gel support. The supported catalyst complex has an activity sufficient for use as a polymerization catalyst for polymerization of olefins under either gas or liquid phase polymerization.

DETAILED DESCRIPTION OF THE PREFERRED EMBODIMENTS

The present invention is directed towards a supported catalyst system for use in either gas phase or liquid. phase polymerization of olefins, particularly the polymerization of ethylene to high molecular weight polyethylenes such as linear low density polyethylene (LLDPE) and high density polyethylene (HDPE). The polymers are intended for fabrication into household and industrial containers by blow molding.

The active catalyst complex comprises a vanadium compound and an alumoxane adsorbed onto the surface of a silica gel support material. Alumoxanes are oligomeric aluminum compounds represented by the general formula $(R-Al-O)_y$ which is believed to be a cyclic compound and $R(R-Al-O)_y AlR_2$, which is a linear compound. In the general formula, "R" is a $C_1$–$C_{10}$ alkyl group such as, for example, methyl, ethy, propy, buty, and pentyl and "y" is an integer from 2 to about 30 and represents the degree of oligomerization of the alumoxane. Preferably, "R" is methyl and "y" is about 4 to about 25 and most preferably 6–25. Generally, in the preparation of alumoxanes from, for example, the reaction of trimethyl aluminum and water, a mixture of linear and cyclic compounds is obtained. Generally, an alumoxane having a hither degree of oligomerization will, for a given vanadium compound, produce a catalyst complex of higher activity than will an alumoxane having a lower degree of oligomerization. Hence, the procedure by which aumoxane is produced by direct reaction of a trialkylaluminum with an undehydrated silica gel should insure the conversion of the bulk quantity of the trialkylaluminum to an alumoxane having a high degree of oligomerization. In accordance with this invention the desired degree of oligomerization is obtained by the order of addition of reactants as described hereinafter.

The preferred vanadium compounds which may be usefully employed in the preparation of the vanadium containing catalyst component of this invention are well known in the art and may be represented by the formulas:

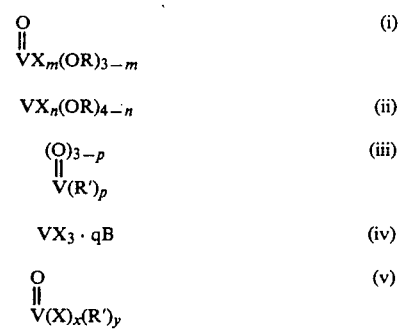

wherein:
m is 0–3;
n is 0 or 3–4;
p is 2–3;
q is 0 or 2–3;
x and y are 1–2, x≠y;
R is a $C_1$–8 acyclic or cyclic hydrocarbon radical, preferably free of ethylenic unsaturation;
R' is acetylacetonate;
X is -Cl or -Br; and B is a Lewis base capable of forming hydrocarbon-soluble complexes with $VX_3$ such as ether. Especially preferred as R are methyl, ethyl, propyl, iso-propyl, butyl, n-butyl, i-butyl, t-butyl, pentyl, hexyl, octyl, cyclohexyl, phenyl, benzyl, dimethyl phenyl, and naphthyl groups.

Illustrative, but nonlimiting examples of the vanadium compounds are vanadyl trichloride, vanadyl tribromide, vanadium tetrachloride, vanadium tetrabromide, vanadium tetrabutoxy, vanadium trichloride, vanadium tribromide, vanadyl diacetylacetonate, vanadium triacetylacetonate, vanadyl dichloroacetylacetonate, vanadyl chlorodiacetylacetonate, and vanadium trichloride or vanadium tribromide complexed with tetrahydrofuran.

Heretofore the alumoxane component of the active catalyst complex for polymerization of olefins has been separately prepared then added as such to a catalyst support material which is then treated with a metal compound to form the active catalyst complex. One procedure heretofore employed for preparing the alumoxane separately is that of contacting water in the form of a moist solvent with a solution of trialkylaluminum in a suitable organic solvent such as benzene or aromatic hydrocarbon. As before noted this procedure is attendant with fire and explosion hazards which requires the use of explosion-proof equipment and carefully controlled reaction conditions. In an alternative method heretofore employed for the separate production of alumoxane, an aluminum alkyl is contacted with a hydrated salt, such as hydrated copper sulfate. The method comprised treating a dilute solution of aluminum alkyl in, for example, toluene, with a copper sulfate pentahydrate. A slow, controlled hydrolysis of the aluminum alkyl to alumoxane results which substantially eliminates the fire and explosion hazard but with the disadvantage of the creation of hazardous waste products that must be disposed of and from which the alumoxane must be separated before it is suitable for use in the production of an active catalyst complex. Separate production of the alumoxane component by either procedure is time consuming and costly. Correspondingly, the use of a separately produced alumoxane greatly increases the cost of producing an alumoxane catalyst.

In accordance with the present invention the alumoxane component of the catalyst complex is prepared by direct reaction of a trialkylaluminum with the material utilized as the catalyst support, namely an undehydrated silica gel. Silica useful as the catalyst support is that which has an average particle size between about $0.1\mu$ and about $200\mu$ ($1\mu = 1.10^{-6}$m); a surface area in the range of about 10 to about 700 $m^2/g$, preferably about 100-500 and desirably about 200-400 $m^2/g$; a pore volume of about 3 to about 0.5 cc/g and preferably 2-1 cc/g; and an adsorbed water content of from about 6 to about 20 weight percent, preferably from about 7 to about 15 weight percent.

Such undehydrated silica gel is added over time, about a few minutes, to a stirred solution of trialkylaluminum, preferably trimethylaluminum or triethylaluminum, in an amount sufficient to provide a mole ratio of trialkylaluminum to water of from about 3:1 to 1:2, preferably about 1.2:1 to 0.8:1. The solvents used in the preparation of the catalyst system are inert hydrocarbons, in particular a hydrocarbon that is inert with respect to the catalyst system. Such solvents are well known and include, for example, isobutane, butane, pentane, hexane, heptane, octane, cyclohexane, methyl- cyclohexane, toluene, xylene and the like. Each alkyl group in the trialkylaluminum independently contains 1 to 10 carbon atoms. Also suitable for use as the trialkylaluminum are tripropyl aluminum, tri-n-butyl aluminum, tri-isobutyl aluminum, tri(2-methylpentyl) aluminum, trihexyl aluminum, tri-n-octyl aluminum, and tri-n-decyl aluminum.

Upon addition of the undehydrated silica gel to the solution of trialkyaluminum, the water content of the silica gel controllably reacts with the trialkylaluminum to produce an alumoxane which is deposited onto the surface of the silica gel particles. Although the reaction of the trialkylaluminum with the water content of the silica gel proceeds relatively quickly (generally within about 5 minutes), it does not occur with the explosive quickness of that which occurs with free water. The reaction may be safely conducted in conventional mixing equipment under a mantle of inert gas.

Thereafter a vanadium compound is added to the stirred suspension of alumoxane silica gel product in an amount sufficient to provide a mole ratio of aluminum to vanadium of from about 1000:1 to about 1:1, preferably from about 300:1 to about 10:1 and most preferably from about 150:1 to about 30:1. The vanadium compound is preferably added to the reaction mixture in the form of a solution. The solvent can be any of the well-known inert hydrocarbon solvents such as those employed in the production of the alumoxane above. The mixture is stirred for about 30 minutes to about one hour at ambient or at an elevated temperature of about 75° C. to permit the vanadium compound to undergo complete complexing reaction with the adsorbed alumoxane. Thereafter, the solvent is removed by filtering or evaporation, and the residual solids are dried to a free flowing powder. The dried free flowing powder comprises a vanadium-alumoxane catalyst complex with a silica gel support of sufficiently high catalytic activity for use in the polymerization of olefins. The average particle size of the free flowing powder is equivalent to that of the particle size of silica employed in the production of the catalyst support material.

The order of addition between the undehydrated silica gel and the trialkylaluminum is important with regards to the activity of the supported catalyst which results upon addition of the vanadium compound. A supported catalyst composition of little or no activity results wherein a trialkylaluminum is added to a stirred solvent suspension of undehydrated silica gel. It has been found that to prepare a supported catalyst composition of acceptable or high activity the order of mixing must be one wherein the undehydrated silica ge is added to a stirred solution of the trialkylaluminum. It is believed that this order of mixing forces the trialkylaluminum to undergo reaction in the context of a transient localized excess of trialkylaluminum compared to a transient localized deficiency of water. Under a mixing condition which slowly adds undehydrated silica gel to a stirred solution of trialkylaluminum, the bulk content of the trialkylaluminum converts to an alumoxane with a degree of oligomerization of about 6-25 (y=6-25). Production of an alumoxane with this degree of oligomerization results in a final vanadium-alumoxane catalyst complex of useful or high activity. A reverse order of mixing, that is, addition of a trialkylaluminum to a stirred solvent suspension of undehydrated silica gel yields a catalyst which has a poor degree of catalytic activity.

In addition to the importance of proper mixing order in achieving a supported catalyst of useful activity, it has also been observed that the water content of the undehydrated silica gel influences final catalyst activity. Hence the undehydrated silica gel should have an adsorbed water content of from about 6 to about 20 weight percent. Preferably the adsorbed water content should be from about 7 to about 15 weight percent.

Further influencing the degree of activity attained in the final supported catalyst complex is the mole ratio of trialkylaluminum to the adsorbed water content of the undehydrated silica gel. The quantities of trialkylaluminum employed should, in comparison to the quantity of undehydrated silica gel of specified adsorbed water content, be selected to provide a mole ratio of trialkylaluminum to water of from about 3:1 to about 1:2, preferably from about 1.5:1 to about 0.8:1, and more preferably from about 1.2:1 to about 0.8:1. It has been observed that for a given vanadium compound, a maximum catalyst activity is generally observed in the trialkylaluminum to water mole ratio range of about 1.2:1 to about 0.8:1. Depending upon the particular trialkylaluminum selected for use, commercially acceptable catalyst activities are exhibited in the trialkylaluminum to water mole ratio range of about 3:1 to about 1:2.

Also influencing the cost of production and the level of catalytic activity obtained in the final supported catalyst complex is the mole ratio of aluminum to vanadium of the vanadium compound. The quantity of vanadium compound added to the alumoxane adsorbed silica gel solids should be selected to provide an aluminum to vanadium mole ratio of from about 1000:1 to about 1:1, preferably from about 300:1 to about 10:1, and most preferably from about 150:1 to about 30:1. From the standpoint of economic considerations it is desirable to operate in the lower ranges of the aluminum to vanadium mole ratio in order to minimize the cost of catalyst production. The procedure of this invention is one which provides the maximum conversion of the trialkylaluminum component to the most efficacious form of alumoxane, hence permits the safe production of a supported vanadium alumoxane catalyst of useful activity with low quantities of the costly trialkylaluminum component.

The molecular weight of the polymers produced in the presence of the catalyst system disclosed herein can be controlled by means well known in the art. In a gas or liquid phase polymerization of olefins, hydrogen is employed in order to control the desired molecular weight of the polymeric end product. Polymerization proceeds generally at a temperature between 25° and 150° C.

The polymers prepared with the catalyst complex and by the method of this invention are homopolymers of ethylene and copolymers of ethylene with higher alpha-olefins having from 3 to about 18 carbon atoms and preferably 3 to 8 carbon atoms. Illustrative of the hither alpha-olefins are propylene, butene-1, hexene-1, and octene-1. Elastomers can also be prepared by copolymerizing ethylene with propylene and dienes, preferably those dienes having up to 20 carbon atoms.

EXAMPLES

Example 1 illustrates the preparation of a $VOCl_3$-triethylaluminum catalyst supported on a dehydrated silica gel. Catalyst Tests A and B illustrate the performance of the catalyst of Example 1 in the polymerization of ethylene in the presence of and absence of a halogenated hydrocarbon, respectively.

Examples 2-5 illustrate the preparation of the supported vanadium-alumoxane catalyst complexes of this invention wherein the alumoxane catalyst component was formed by reaction of a trialkylaluminum with an undehydrated silica gel). Catalyst Tests C and D illustrate the performance of the catalyst of Example 2-5.

Example 1 (Comparative)

Silica gel (5.0 g, Davison 948 silica gel, dehydrated at 500° C.) was added to a vial containing 20 ml of hexane. Four and three tenths (4.3) milliliters of triethylaluminum/heptane solution (1.58M) was then charged into the vial. The resulting mixture was allowed to react at ambient temperature for 30 minutes. Thereafter 2.4 ml of neat benzoylchloride was added to the vial and the reaction was permitted to proceed at room temperature for one hour. To the vial was then added 2.0 ml of a hexane solution of $VOCl_3$ (0.7M). After allowing this mixture to react at ambient temperature for one hour and permitting the resulting solids to settle, the supernatant was decanted from the vial. The mixture was then stirred for 10 minutes after the addition to the vial of 20 ml. of hexane. After decantation of the supernatant, the catalyst was dried to a free flowing powder by nitrogen purging.

Catalyst Test A

A freshly cleaned 2.2 liter autoclave was heated to 60° C. and flushed with nitrogen for 30 minutes. After cooling to room temperature, 0.6 ml of triethylaluminum in a solution of heptane (1.67M) and 0.9 ml of (liquid) Freon-11 were charged into the reactor containing 850 ml of dried, oxygen-free hexane. After heating the reactor to 85° C., 31 mmole of hydrogen and 100 ml of 1-hexene were added. The reactor was then pressurized by adding thereto 150 psig of ethylene gas. Seventy-five (75) mg of the catalyst of Example 1 (Comparative) was then injected into the reactor. After a reaction time of 40 minutes, 83 g of polyethylene was recovered.

Catalyst Test B

The procedure of Example 2 was followed with the exception that no Freon-11 was added to the reactor. One (1) g of polyethylene was recovered.

Example 2

Undehydrated silica gel was employed in accordance with the procedure of this invention to prepare a silica gel supported $VOCl_3$ methylalumoxane catalyst complex, as follows:

A one liter three neck flask equipped with a magnetic stirring bar was charged with 170 ml of dried and degassed heptane. One hundred thirty (130) milliliters of trimethylaluminum/heptane solution (1.5M) was then charged into the flask. A clear solution was formed. Thereafter 50 g of undehydrated silica gel (Davison 948 with average particle size of 50μ) which contains 8.5 weight percent water was added slowly into the flask through a solids addition vessel. The resulting mixture was allowed to react under stirring at ambient temperature for 1 hour. The volatile solvent was then removed by nitrogen purging while the flask was heated to a drying temperature of 75° C. in an oil bath until the contents of the flask became solid. The mixture was then dried to a free flowing powder by vacuum drying at ambient temperature. Thereafter, 5.0 g of the free flowing powder was transferred to a 125 ml vial. Added sequentially to the vial were 30 ml of hexane and 2.0 ml of VOCl$_3$ dissolved in hexane (0.7M). The resulting mixture was allowed to react at ambient temperature for 30 minutes. The solvent was then removed by nitrogen purging and the catalyst solids isolated by vacuum evaporation.

Example 3

The procedure of Example 2 was followed with the exception that 130 ml of triethylaluminum/heptane solution (1.5M) was charged into the dried three-neck flask.

Example 4

Undehydrated silica gel was employed in accordance with the procedure of this invention to prepare a silica gel supported VOCl$_3$ methylalumoxane catalyst complex, as follows:

A one liter three neck flask equipped with a magnetic stirring bar was charged with 300 ml of dried and degassed heptane. Two hundred-sixty (260) milliliters of trimethylaluminum/heptane solution (1.5M) was then charged into the flask. Thereafter 100 g of undehydrated silica gel (Davison 948) which contained 8.7 weight percent water was added slowly into the flask through a solids addition tube. The resulting mixture was allowed to react under stirring at ambient temperature for 1 hour. Thereafter 40.0 ml of VOCl$_3$ dissolved in hexane (0.7M) was added to the flask and the resulting mixture was allowed to react under stirring for 30 minutes at ambient temperature. The volatile solvent was then removed by nitrogen purging while the flask was heated to a temperature of 65° C. in an oil bath until the contents of the flask became solid. The mixture was then dried to a free flowing powder by vacuum drying at ambient temperature.

Example 5

100 g of undehydrated silica gel (Davison 948) which contained 7.4 weight percent water was added into a three-neck dried flask containing 260 ml of triethylaluminum/heptane solution (1.5M) and 360 ml of heptane, and thereafter the mixture was dried. The dried mixture was reslurried with 400 ml of hexane followed by the addition of 40.0 ml of VOCl$_3$ dissolved in hexane (0.7M). The mixture was then dried to a free flowing powder.

Catalyst Test C

The activity of the catalyst powders of Examples 2 to 5 were determined at ambient temperature and 5 psig ethylene pressure by the following procedure. To a 150 milliliter vial, equipped with magnetic stirrer, was charged 4 grams of catalyst composition. At ambient temperature ethylene gas at 5 psig was fed into the vial. Polymerization of the ethylene was allowed to proceed for one hour. The yield of polyethylene obtained with each catalyst composition is reported in Table I.

TABLE I

| CATALYST TEST A RESULT | |
|---|---|
| Catalyst | Amount Polyethylene Formed, g |
| Example | |
| 2 | 6.8 |

TABLE I-continued

| CATALYST TEST A RESULT | |
|---|---|
| Catalyst | Amount Polyethylene Formed, g |
| 3 | 6.1 |
| 4 | 7.4 |
| 5 | 3.6 |

Catalyst Test D

The activity of the catalyst of Example 4 was determined in a continuous fluid bed gas phase polymerization reactor at 300 psig total pressure and 165° F. Ethylene was copolymerized with hexene-1.

During the polymerization, ethylene, hexene-1, hydrogen and nitrogen were continuously fed into the reactor to maintain the following constant gas concentrations:

| | |
|---|---|
| Nitrogen | 62.0 mole percent |
| Ethylene | 30.0 mole percent |
| Hexene-1 | 2.0 mole percent |
| Hydrogen | 6.0 mole percent |

The velocity of the gas in the reactor was 0.7 ft./sec. Catalyst was periodically injected into the reactor as required to maintain a constant production rate of about 200 g polymer/hr. Polymer product was periodically removed from the reactor through a valve to maintain a constant bed weight in the reactor.

The polymerization reaction was conducted for more than 24 hours. Table II lists properties of the polymer produced.

TABLE II

| Hours After Steady State | Yield g/hr | Mw | Mw/M | Density g/cc |
|---|---|---|---|---|
| 12 | 213 | — | — | 0.924 |
| 15 | 187 | — | — | 0.927 |
| 18 | 215 | 86,000 | 60.6 | 0.923 |

The invention has been described with reference to its preferred embodiments. From this description, a person of ordinary skill in the art may appreciate changes that could be made in the invention which do not depart from the scope and spirit of the invention as described above and claimed hereafter.

I claim:

1. A process of preparing a polymer derived from at least one alpha-olefin by polymerizing an alpha-olefin at a temperature between 20° and 350° C., a pressure between 1 and 3,000 atmospheres and in the presence of a supported non-metallocene vanadium-alumoxane catalyst complex, said catalyst complex obtained by
   (a) adding a undehydrated silica gel to a stirred solution of a trialkylaluminum in an amount sufficient to provide a mole ratio of trialkylaluminum to water of from about 3:1 to about 1:2 and allowing the mixture to react;
   (b) adding an non-metallocene vanadium compound to the reacted mixture;
   (c) removing the solvent; and
   (d) drying the solids to form a free flowing powder.

2. The process of claim 1 wherein the polymerization is performed in the absence of a promoter.

3. The process of claim 2, wherein said undehydrated silica gel has a water content of from about 6 to about 20 weight percent.

4. The process of claim 2, wherein the mole ratio of aluminum to vanadium in said vanadium compound is from about 1000:1 to about 1:1.

5. The process of claim 3, wherein said undehydrated silica gel has a water content of from 6 to about 20 weight percent and the mole ratio of trialkylaluminum to water is from about 3:1 to about 1:2.

6. The process of claim 5, wherein the mole ratio of aluminum to vanadium in said vanadium compound is from about 1000:1 to about 1:1.

7. The process of claim 6, wherein the trialkylaluminum is trimethylaluminum or triethylaluminum.

8. The process of claim 7, wherein the said undehydrated silica gel has a surface area of from about 200 to about 400 m$^2$/g, a pore volume of from about 1 to about 2 cc/g and a particle size from about 0.1 to 200 I.

9. The process of claim 1, wherein said vanadium compound is selected from the group consisting of:

$$\overset{O}{\underset{\|}{V}}X_m(OR)_{3-m} \quad (i)$$

$$VX_n(OR)_{4-n} \quad (ii)$$

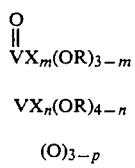 (iii)

$$V(R')_p \quad (iv)$$
$$VX_3 \cdot qB$$

$$\overset{O}{\underset{\|}{V}}(X)_x(R')_y \quad (v)$$

wherein:
  m is 0–3;
  n is 0 or 3–4;
  p is 2–3;
  q is 0 or 2–3;
  x and y are 1–2, x=y;
  R is a $C_1$–$C_8$ hydrocarbon radical;
  R' is a actylacetonate;
  X is -Cl or -Br; and
  B is a Lewis base capable of forming hydrocarbon-soluble complexes with $VX_3$.

10. The process of claim 9, wherein said vanadium compound is selected from the group consisting of vanadyl trichloride, vanadyl tribromide, vanadium tetrachloride, vanadium tetrabromide, vanadium tetrabutoxy, vanadium trichloride, vanadium tribromide, vanadyl acetylacetonate, vanadium acetylacetonate, vanadyl dichloroacetylacetonate, vanadyl chlorodiacetylacetonate, and vanadium trichloride or vanadium tribromide complexed with tetrahydroduran.

11. The process of claim 10 wherein said vanadium compound is vanadyl trichloride.

* * * * *